US005256046A

United States Patent [19]

Korsch et al.

[11] Patent Number: 5,256,046

[45] Date of Patent: Oct. 26, 1993

[54] PRESS FOR PRODUCING COATED-CORE TABLETS

[75] Inventors: Wolfgang Korsch; Michael Schmett, both of Berlin, Fed. Rep. of Germany

[73] Assignee: Korsch oHG Maschinenfabrik, Berlin, Fed. Rep. of Germany

[21] Appl. No.: 741,142

[22] Filed: Aug. 7, 1991

[30] Foreign Application Priority Data

Aug. 8, 1990 [DE] Fed. Rep. of Germany ....... 4025484

[51] Int. Cl.[5] ............................................. A23P 1/08

[52] U.S. Cl. ................................ 425/126.1; 425/128; 425/345; 425/353; 425/415

[58] Field of Search ..................... 425/345, 353, 126.1, 425/127, 128, 344, 352, 354, 355, 348 R, 415; 264/275; 100/226

[56] References Cited

U.S. PATENT DOCUMENTS

| | | | |
|---|---|---|---|
| 2,514,486 | 7/1950 | Green | 425/355 |
| 2,946,298 | 7/1960 | Doepel et al. | 264/275 |
| 2,963,993 | 12/1960 | Stott | 425/345 |
| 3,677,673 | 9/1981 | Doepel | 425/345 |
| 4,292,017 | 9/1981 | Doepel | 425/345 |
| 4,362,493 | 12/1982 | Doepel | 425/345 |
| 5,088,915 | 2/1992 | Korsch et al. | 425/353 |
| 5,116,214 | 5/1992 | Korsch et al. | 425/345 |

FOREIGN PATENT DOCUMENTS

| | | |
|---|---|---|
| 0349777 | 7/1989 | European Pat. Off. . |
| 1023191 | 1/1958 | Fed. Rep. of Germany . |
| 1095462 | 12/1960 | Fed. Rep. of Germany . |

*Primary Examiner*—Jay H. Woo
*Assistant Examiner*—Joseph Leyson
*Attorney, Agent, or Firm*—McGlew and Tuttle

[57] ABSTRACT

The invention relates to a press for producing coated-core tablets, and includes a rotor 1 with a die table 4 provided with dies 14, and upper and lower sections 3, 4 for guiding the upper or lower stamps, 9, 11, resp., in the dies 14, radial arms 25 with transfer heads 34 for receiving and transferring the cores 17, and receiving pockets 16 associated to the radial arms for the cores 17. In order to allow, for a size as small as possible of the press, that synchronism of the transfer heads 34 and of the dies 14 during transfer of the cores is secured in simple manner and without friction and noise resulting therefrom, it is provided, according to the invention, that the radial arms 25 are supported in the form of pistons 26 in the rotor 1, and that the receiving pockets 16 are arranged at the die table 5.

9 Claims, 5 Drawing Sheets

PRESS FOR PRODUCING COATED-CORE TABLETS

FIELD OF THE INVENTION

The invention relates to a press, and in particularly to a press for producing coated-core tablets with a transfer mechanism mounted on the rotor for transferring the cores.

BACKGROUND OF THE INVENTION

A press of the mentioned species is known in the art from EP-A-0,349,777 Al. Therein, the radial arms are inwardly and outwardly movably supported at a transfer device located adjacent to the press. To the transfer device is associated an annular disk rotating together with the radial arms, said disk being disposed underneath the radial arms and being provided with receiving pockets associated to the transfer heads for one core each. The transfer device is rotatably driven about an axis parallel to the axis of the die table. The partial circles of the transfer heads and the partial circles of the dies overlap over the distance of two dies, the transfer heads being guided, in the overlap area of the partial circles, on the partial circle of the die table. For this purpose, the rotor of the press carries a guide rim with semi-circular receiving depressions, wherein the transfer heads of the transfer device are guided, in order to effect the overlap of the partial circles of the die table and of the transfer heads. It has been found out that in particular for high rotational speeds of the rotor, problems exist when the transfer heads engage into the receiving depressions of the guide rim of the press. Furthermore, problems may come up when releasing the transfer heads from the receiving depressions. In addition, disturbing noise and undesired frictions will be generated when the transfer heads engage into the receiving depressions. Finally, the transfer device requires approximately the same space as the press itself, since the partial circles of the transfer heads and of the dies must be identical so to obtain identical peripheral speeds.

SUMMARY AND OBJECTS OF THE INVENTION

The present invention is based on the subject, therefore, to improve a press of the aforementioned species such that for a size as small as possible of the press, synchronism of the transfer heads and of the dies during transfer of the cores is secured in simple manner and without friction and noise resulting therefrom.

As a solution of this object, the invention provides that the radial arms are supported in the rotor, and that the receiving pockets are arranged at the die table. According to the invention, therefore, thus a separate transfer device not being required anymore. The size of the press in total is, thereby, reduced to the size required for the rotor. Since, further, the receiving pockets for the cores are arranged at the die table itself, a simple movement of the radial arms over the die table only is necessary to transfer the cores form the receiving pockets into the dies.

In a preferred embodiment, the receiving pockets are arranged on a partial circle of the die table, said partial circle being larger than the partial circle of the dies itself, so that the radial arms are inwardly and outwardly movably supported in the rotor, so to be able to be displaced from the partial circle of the dies into the partial circle of receiving pockets and vice versa. For performing the press procedure of the core tablet between the two stamps, the transfer heads are guided back onto a partial circle being smaller than the partial circle of the dies.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 1:
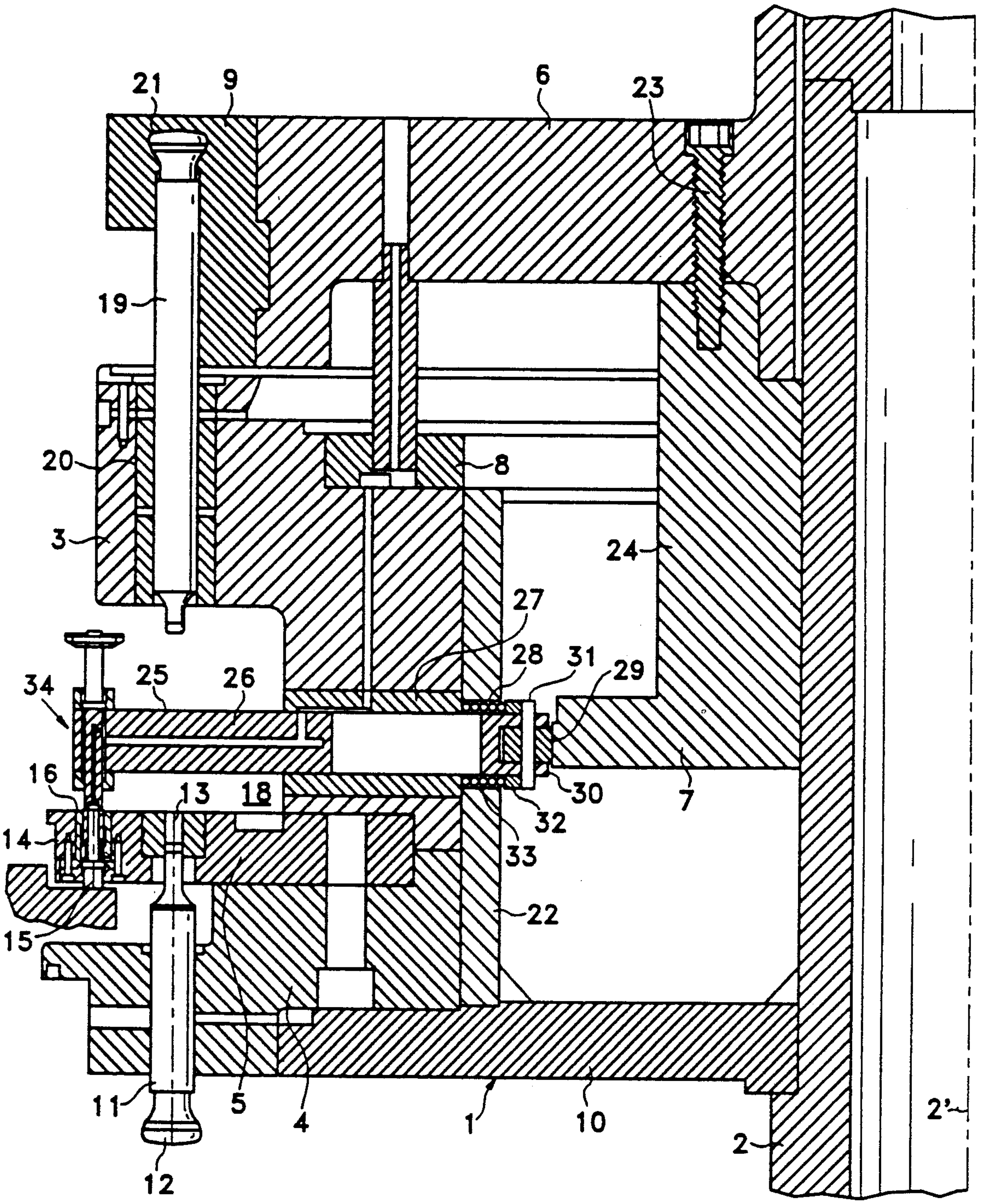
FIG. 1 a vertical section through the press for producing coated-core tablets when the core is received, FIG. 2 a vertical section through the press according to FIG. 1 when the core is received, FIG. 3 a vertical section according to FIG. 1 through the press in the pressing position, FIG. 4 an enlarged detail of FIG. 1 when the core is received, and FIG. 5 a principal horizontal cross section through the press.

The press for producing coated-core tablets comprises a rotor 1 being fixed to a rotating drive shaft 2, and an upper stamp section 3, a lower stamp section 4 with a die table 5 fixed therebetween, and a stationary curved bell 6 with a cam disk 7, a vacuum disk 8 and an upper stamp guide cam 9. The curved bell 6 is fixed in the structure, and the drive shaft 2 is supported within the curved bell 6 by means of bearings not shown in detail.

The rotor 1 comprises a circular support plate 10 mounted onto the drive shaft 2, the annular lower section 4 being rigidly attached to said support plate. The heads 12 of the lower stamps or punches 11 are guided in a manner not shown in more detail, in order to effect a vertical up and down movement of the stamps 11. Onto the lower section 4 is mounted the circular disk-shaped die table 5. The latter comprises a partial circle 13 for the dies 14, a partial circle 15 having a larger diameter for the receiving pockets 16 of the cores 17 and a free space 18 having a smaller diameter than the partial circle 13 for the dies 14 for a purpose which is described hereinbelow.

Above the lower section 4 and the die table 5, there is provided an upper section 3 attached at the rotor 1. The upper section serves for guiding the upper stamps 19 being supported in guide bushings 20 within the upper section 3. The heads 21 of the upper stamps or punches 19 are guided in the upper stamp guide cam 9, which is fastened to the fixed curved bell 6. The support plate 10 welded to the drive shaft 2 is rigidly connected with a welded-on support cylinder 22 arranged concentrically with the axis of the drive shaft 2. The support cylinder 22 forming an internal support for the upper section 3 and the lower section 4 of the rotor 1.

Figure 5:
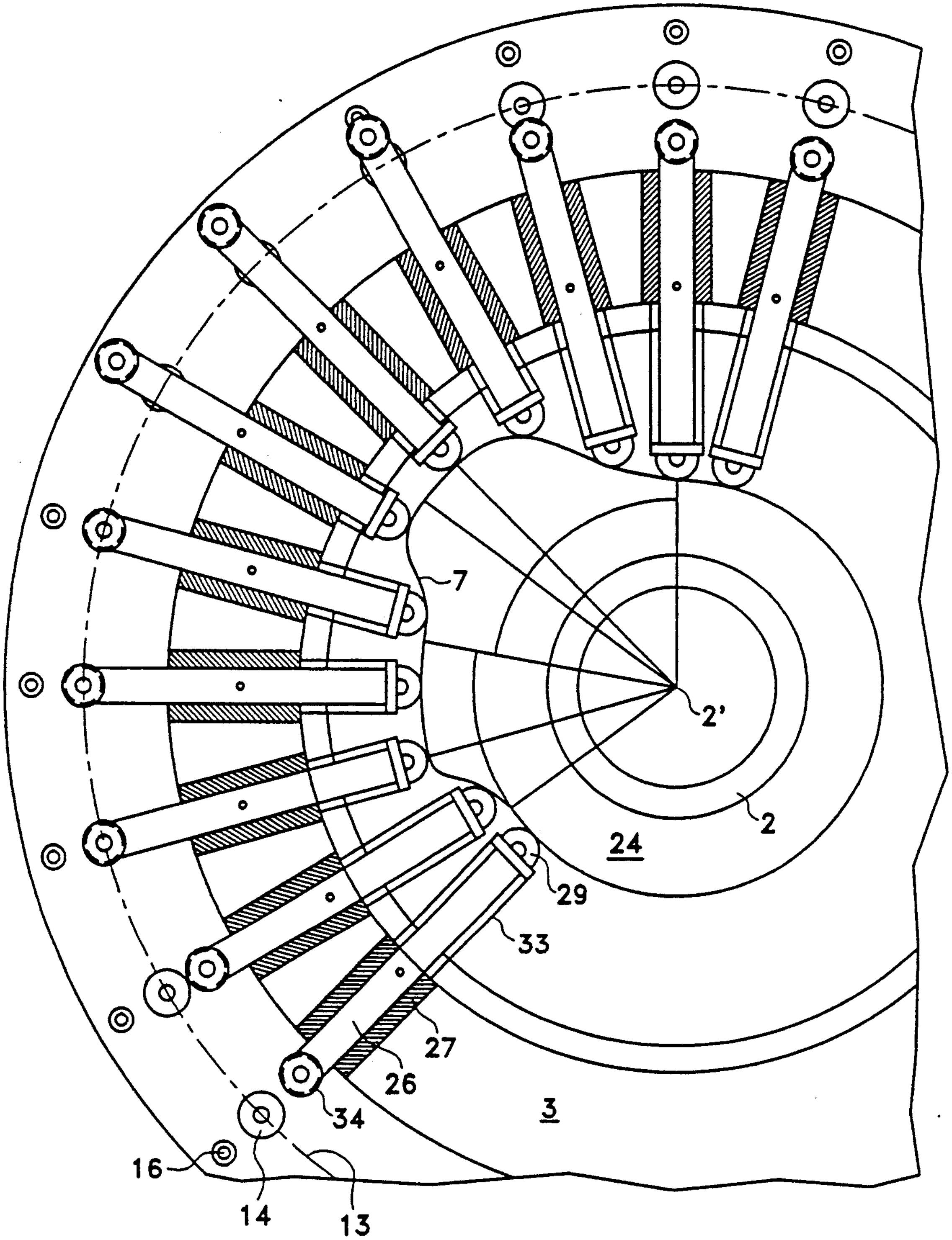

On the curved bell 6, the cam disk 7 is fixed by means of threaded bolts 23. The base body 24, forming the cam disk 7 at its lower section, is disposed concentrically to the drive shaft 2. The shape of the cam disk 7 results from the cross section according to FIG. 5. Radial arms 25 are operated by the dam disk 7. The radial arms being adapted as piston 26 having a polygonial profile, and being supported, radially with respect to the axis of the drive shaft 2, in bushings 27 radially mounted in the upper section 3 and having a polygonial profile. For passing the pistons 26 through, the support cylinder 22 of the rotor 1 has radial through-openings 28. At the radially inwardly disposed end of the piston 26, support rolls 29 are supported over antifriction bearings, in particular needle bearings, in receiving slots. The rolls 29 being rotatable on a bearing pin 31 disposed transversely to the longitudinal axis of the piston 26. On the side disposed radially outwardly of each bearing pin 31, there is supported a limiting disk 32 for a compression spring 33. The spring 33 rests against the front radially inwardly directed of the polygonial bushings 27, and effects a permanent press-on force for the support roll 29 on the outer curve of the cam disk 7.

The press shown in the figures carries, on the table 5, twenty four (24) dies 14 with respective lower and upper stamps 11, 19, and with respective radial arms 25 in the form of pistons 26. Each piston 26 carries at its radially outward, free end a transfer head 34 being represented in an enlarged scale in FIG. 4, together with a receiving pocket 16 and the respective die 14. Each transfer head 34 comprises a head section 35 provided with a bore 36 for receiving the piston 26. The head section 35 is non-rotatably and non-displaceably fixed at the piston 26. Transversely to the longitudinal direction 37 of the piston 26, and parallely to the axis 2' of the drive shaft 2 extends a core stamp 38 serving for receiving and transferring the cores 17. The core stamp 38 penetrates a lower bore 39 of the head section 35 provided with a slide guiding, and is further guided by a collar 41 sliding, in the upper section of the head section 35, in an internal bore 40. In the internal bore 40, at the upper end thereof, an annular disk 42 is fixed by means of a circlip 43. Between the collar 41 of the core stamp 38 and the bottom of the internal bore 40 of the head section 35 extends a compression spring 44 effecting a permanent pressure of the collar 41 of the core stamp 38 against the annular disk 42.

Within the core stamp 38 is provided a longitudinal bore 45 terminating as a blind hole approximately in the center and extending, over a transverse bore 46, into the internal space 47 formed by the internal bore 40 of the head section 35. Thereinto extends a longitudinal bore 48 of the piston 26 terminating approximately in the longitudinal center area of the piston 26 and extending over a transverse bore 49 with an axial channel 50 of the polygonial bushing 27. The axial channel 50, in turn, is connected over a bore 51 extending parallely to the axis 2' of the drive shaft 2 within the upper section 3. The bore 51 terminating in the vacuum chamber 52 of the fixed vacuum disk 8. The latter is connected, over a pipe section 53, with a bore 54 in the curved bell 6, to which a controllable vacuum device not shown in more detail is connected. By the vacuum device, an under pressure can be generated, in the manner described above, at the suction port 55 of the core stamp 38 for receiving the core 17, for this purpose the suction port 55 being formed as a receiving depression adapted to he shape of the core 17.

Figure 4:
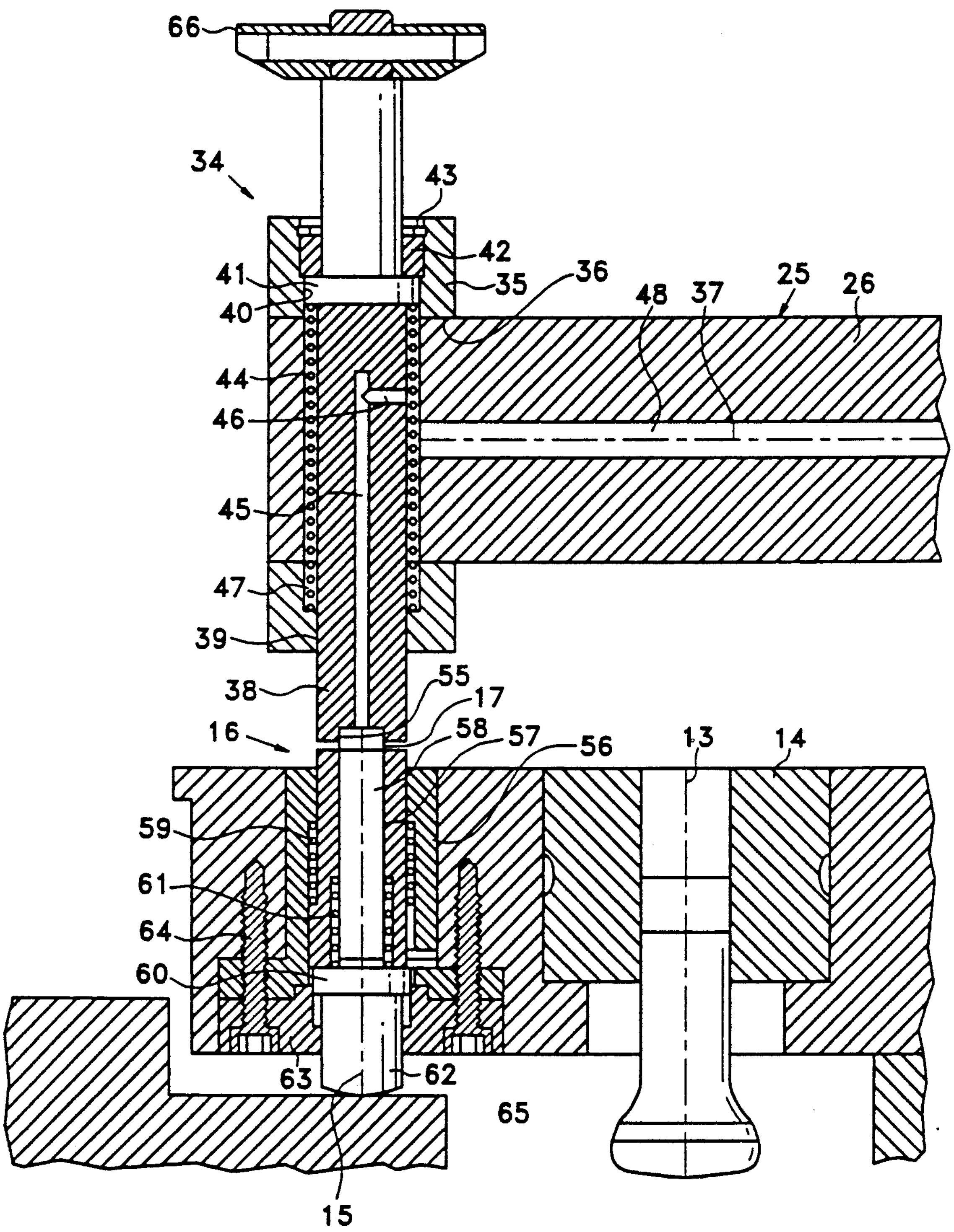

The cores 17 are supplied to the core stamp 38 of the transfer head 34 from the receiving pockets 16 of the die table 5, as is shown in FIG. 4 in an enlarged representation and as is described in the following. Each receiving pocket 16 consists of an external guide bushing 56 rigidly inserted into an axial bore of the die 5, of a hollow external stamp 57 guided in the guide bushing 56, and of an internal stamp 58 guided, in turn, in the external stamp 57. Between the external guide bushing 56 and the external stamp 57, an external compression spring 59 is provided. Between the external stamp 57 and a collar 60 of the internal stamp 58 there is arranged an internal compression spring 61. Spring 61 loads the external stamp 57 or the internal stamp 58, resp. The lower head 62 of the internal stamp 58 is guided in a guide plate 63 screwed on together with guide bushing 56, over threaded bolts 64 in the die table 5. The head 62 of the internal stamp 58 is loaded by a lifting cam disk 65 being fixedly supported in the structure.

The mode of operation of the press described above for producing coated-core tablets is described hereinafter.

With the external and internal stamps 57, 58 lowered under the action of the compression springs 59, 61 or the receiving pocket 16, a core 17 is supplied to the receiving pocket 16 over a non-shown supply device. Reception of the core is performed by piston 26 moved outwardly according to FIG. 1. The transfer head 34 is exposed to a vacuum, and simultaneously, over the lifting cam disk 65, the head 62 so the internal stamp 58 of the respective receiving pocket 16 is lifted. Lifting is performed against the action of the internal spring 61. When the collar 60 hits the lower front side of the external stamp 57, this is also lifted against the action of the external spring 59. The core 17 being in the receiving pocket 16 is now transferred into the suction port 55 of the core stamp 38 of the transfer head 34. Simultaneously, the lifting cam disk 65 ends, and the stamps 57, 58 are lowered.

Figure 2:
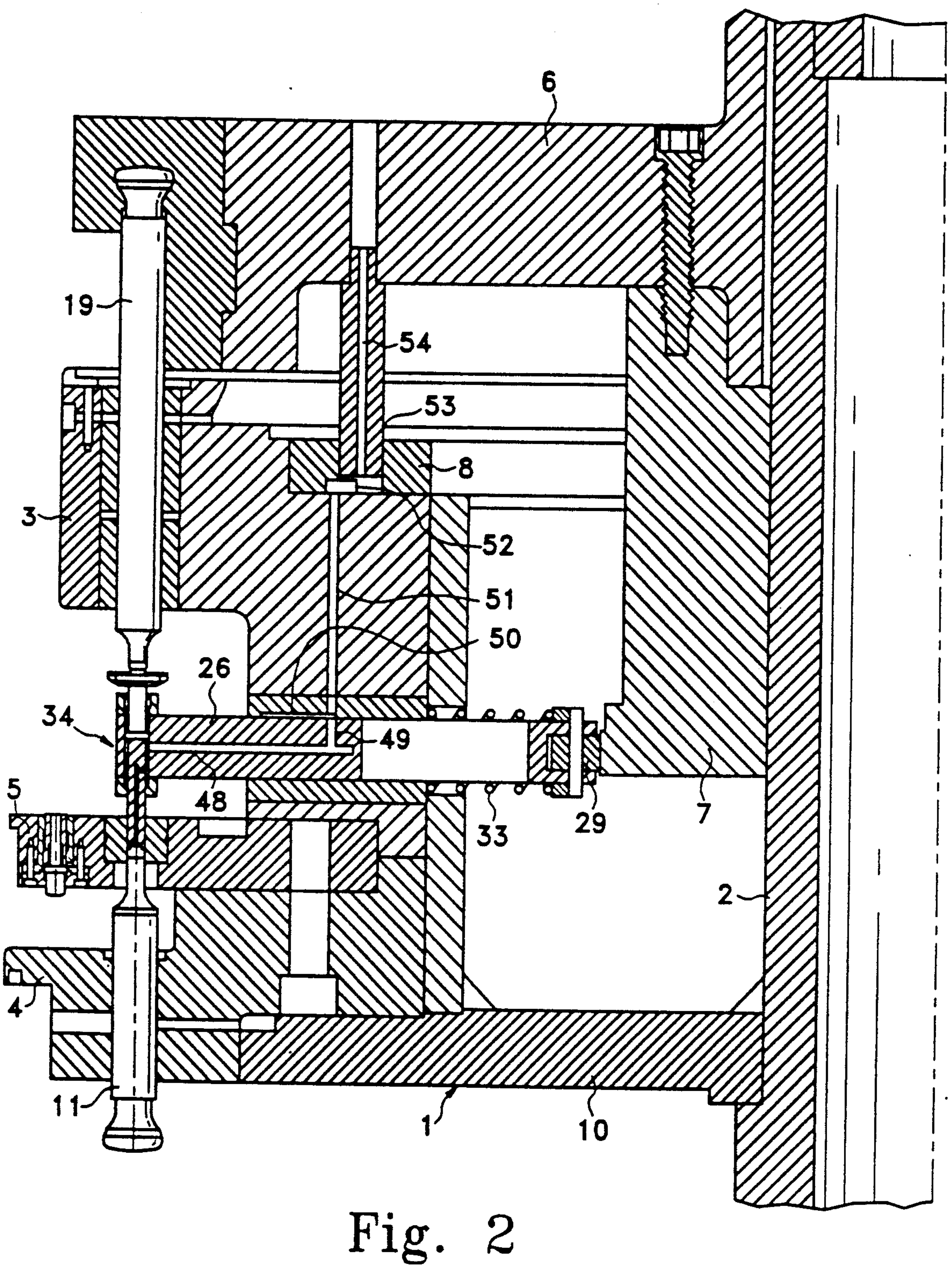
Figure 3:
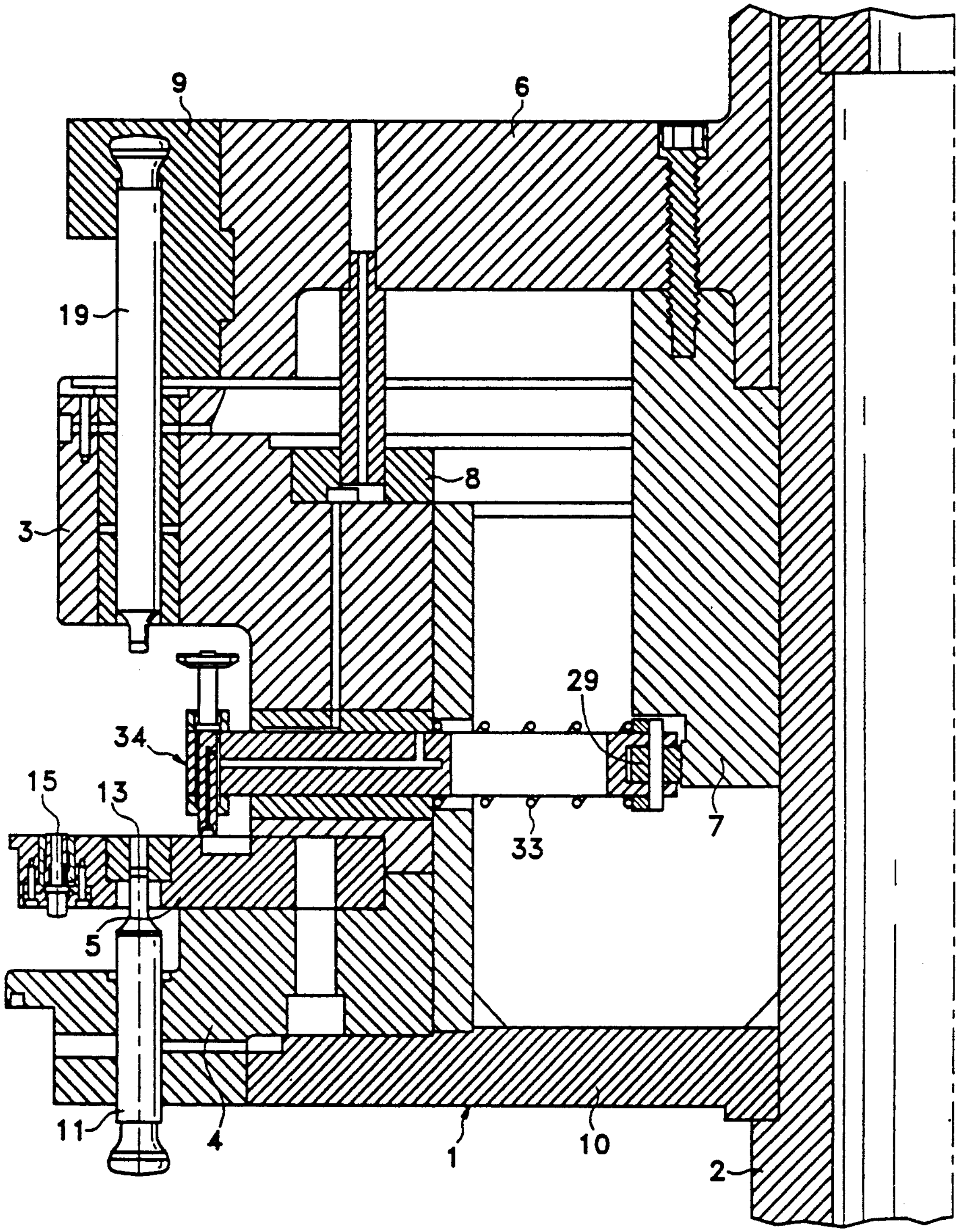

After receiving a core 17, a radially inward movement of the transfer head is performed, under the vacuum of the axial channel 50, by the cam disk 7 and the compression spring 33 associated thereto. The movement is from the partial circle 15 of the receiving pockets 16 into the partial circle 13 of the dies 14. The transfer head is now above a die 14 for core transfer according to FIG. 2. The die has partially been filled before, with lowered lower stamp 11, and with a lower powder material by a nonshown filling and dosing device. Into the lower powder material present within the die 14 on the lower stamp 11, the core 17 is now pressed in by means of the transfer head 34. For this purpose, the core stamp 38 is pressed in, under the action of the upper stamp 19 against the action of the compression spring 47, and maintaining the vacuum. Subsequently, the vacuum is switched off, the upper stamp 19 is lifted under the action of the upper stamp cam disk 9, and simultaneously, the core stamp 38 is guided out off the die 14 under the action of the compression spring 47. Then, again under the action of the cam disk 7 and of the compression spring 33 the piston 26 is moved radially inwardly, and another radial introduction of the transfer head 34 into the free space 18 takes place. The free space 18 being located radially inwardly outside the area of the dies 14 being in the partial circle 13. In this position of the transfer head 34, now the pressing procedure of the coated-core press can be performed. Under the action of upper and lower stamps 11, 19, and after the core 17 is present on the lower powder layer, an upper powder layer is applied by means of the nonshown filling and dosing device and the core 17 is pressed. From the pressing position shown in FIG. 3, after lifting the upper stamp 19, the transfer head 34 is again moved radially outwardly, under the action of the cam disk 7, into the partial circle 15 of the receiving pockets 16, so that another core reception according to FIG. 1 can take place.

The rotor 1 of the press for producing coated-core tablets rotates with high speed, so that with, e.g., 24 stamp tools, a throughput of 200,000 tablets per hour is achieved. Centrally pressing the core 17 into the lower powder layer is necessary herein, so to prevent a displacement of the core 17 under the action of occurring centrifugal forces. In order to guarantee that the core stamp 38 can, after being introduced into the die 14 and the transfer of the core 17, also securely be extracted from the die 14, each core stamp 38 is provided with a head 66 running onto a non-shown guide cam for safely guiding the core stamp 38 out. The guide cam providing for the vertical lift of the core stamp 38, in addition to the compression spring 47.

While specific embodiments of the invention have been shown and described in detail to illustrate the application of the principles of the invention, it will be understood that the invention may be embodied otherwise without departing from such principles.

I claim:

1. A press for producing tablets, the press comprising:
a rotor fixed to a drive shaft and rotating with said drive shaft;
a lower stamp section connected to said rotor, said lower stamp section including a lower punch;
an upper stamp section connected to said rotor, said upper stamp section being positioned axially opposite said lower stamp section and including an upper punch;
a die table connected to said rotor and positioned axially between said upper and lower stamp sections, said die table including a plurality of dies aligned in a substantially partial circle, said die table also including a plurality of receiving pocket means for holding a tablet core;
radial arm means connected to said rotor and axially positioned between said die table and said upper stamp section, said radial arm means radially movable towards and away from said drive shaft;
transfer head means connected to and moving with said radial arm means, and for receiving and transferring the tablet cores from one of said receiving pocket means to one of said plurality of dies.

2. A press in accordance with claim 1, wherein:
said plurality of receiving pocket means are positioned on said die table in a substantially partial circle having a diameter larger than a diameter of substantially partial circle of said plurality of dies.

3. A press in accordance with claim 1, wherein:
said radial arm means includes a piston guided in bushings said radial head means being connected to an outwardly radial end of said piston, said piston also having an inner radial end with a roller and a sprig means for biasing said piston radially inward, said radial arm means including a cam disk means in contact with said roller and for moving said piston radially.

4. A press in accordance with claim 3, wherein:
said plurality of dies and said plurality of receiving pocket means are radially aligned; and
said rotor and said cam disk means rotate relative to each other.

5. A press for producing tablets, the press comprising:
a rotor fixed to a drive shaft and rotating with said drive shaft;
a die table connected to said rotor, and including a plurality of dies aligned in a substantially partial circle, said die table also including a plurality of receiving pocket means for holding tablet cores;
a first stamp section connected to said rotor and positioned on an axial side of said die table, said first stamp section including a punch;
a second stamp section connected to said rotor and positioned on an axial side of said die table substantially opposite from said first stamp section, said second stamp section including a punch means for cooperating with one of said plurality of dies and with said punch of said first stamp section to compress and form the tablet;
radial arm means connected to said rotor and axially positioned between said die table and said second stamp section, said radial arm means radially moving on said rotor towards and away from said drive shaft and rotating with said rotor about said drive shaft;
transfer head means connected to and moving with said radial arm means, and for receiving and transferring the tablet cores from one of said receiving pocket means to one of said plurality of dies.

6. A press in accordance with claim 5, wherein:
said receiving pocket means includes axial movement means for moving the core into contact with said transfer head means.

7. A press in accordance with claim 5, wherein:
said transfer head means includes vacuum passage means for receiving and holding the core from said receiving pocket means by creating a vacuum between the tablet and said transfer head means.

8. A press in accordance with claim 5, wherein:
said second section includes a bushing means positioned around said punch means and for sliding said punch means axially.

9. A press in accordance with claim 5, wherein:
said receiving pocket means are positioned radially outward from said dies; and
said radial arm means positions said transfer head means axially opposite said receiving pockets in a first position and said radial arm means positions said transfer head means axially opposite said one of said dies in a second position.

* * * * *